United States Patent
Borecki et al.

(10) Patent No.: US 10,676,574 B2
(45) Date of Patent: Jun. 9, 2020

(54) SILICONE COMPOSITION AND PROCESS USEFUL FOR IMPROVING THE CREASE RESISTANCE AND ABRASION RESISTANCE OF AIRBAGS, INTENDED FOR PROTECTING A VEHICLE OCCUPANT

(71) Applicant: Bluestar Silicones France SAS, Lyons (FR)

(72) Inventors: Karine Borecki, Civrieux (FR); Anne Seggio, Lyons (FR); Damien Djian, Genas (FR); Bertrand Bordes, Lyons (FR)

(73) Assignee: Elkem Silicones France SAS, Lyons (FR)

( * ) Notice: Subject to any disclaimer, the term of this patent is extended or adjusted under 35 U.S.C. 154(b) by 102 days.

(21) Appl. No.: 15/762,603

(22) PCT Filed: Sep. 22, 2016

(86) PCT No.: PCT/FR2016/000146
§ 371 (c)(1),
(2) Date: Mar. 23, 2018

(87) PCT Pub. No.: WO2017/051085
PCT Pub. Date: Mar. 30, 2017

(65) Prior Publication Data
US 2018/0273691 A1    Sep. 27, 2018

(30) Foreign Application Priority Data

Sep. 25, 2015 (FR) .................................... 15 01993

(51) Int. Cl.
| | | |
|---|---|---|
| *C08G 77/38* | (2006.01) | |
| *B60R 21/235* | (2006.01) | |
| *C08G 77/12* | (2006.01) | |
| *C08G 77/20* | (2006.01) | |
| *C09D 183/04* | (2006.01) | |
| *D06M 15/65* | (2006.01) | |
| *D06N 3/12* | (2006.01) | |
| *D06M 101/34* | (2006.01) | |
| *D06M 101/32* | (2006.01) | |

(52) U.S. Cl.
CPC ............ *C08G 77/38* (2013.01); *B60R 21/235* (2013.01); *C08G 77/12* (2013.01); *C08G 77/20* (2013.01); *C09D 183/04* (2013.01); *D06M 15/65* (2013.01); *D06N 3/128* (2013.01); *B60R 2021/23514* (2013.01); *D06M 2101/32* (2013.01); *D06M 2101/34* (2013.01); *D06N 2201/0263* (2013.01); *D06N 2203/066* (2013.01); *D06N 2209/105* (2013.01); *D06N 2211/268* (2013.01); *D10B 2331/02* (2013.01); *D10B 2331/04* (2013.01); *D10B 2401/061* (2013.01); *D10B 2505/124* (2013.01)

(58) Field of Classification Search
CPC ........ C08G 77/38; C08G 77/12; C08G 77/20; B60R 21/235; B60R 2021/23514; C09D 183/04; D06M 15/65; D06M 2101/32; D06M 2101/34; D06N 3/128; D06N 2201/0263; D06N 2203/066; D06N 2209/105; D06N 2211/268; D10B 2331/02; D10B 2331/04; D10B 2401/061; D10B 2505/124
USPC ...................................... 427/385.5
See application file for complete search history.

(56) References Cited

U.S. PATENT DOCUMENTS 5,789,084 A * 8/1998 Nakamura ............ B60R 21/235
428/425.5

OTHER PUBLICATIONS

PCT International Search Report for PCT/FR2016/000146, dated Nov. 22, 2016.

* cited by examiner

*Primary Examiner* — Ling Siu Choi
*Assistant Examiner* — Ronald Grinsted
(74) *Attorney, Agent, or Firm* — McBee Moore & Vanik IP, LLC

(57) ABSTRACT

The general field of the invention is that of silicone coating compositions, in particular those of two-component or multi-component type, that can be crosslinked by polyaddition or hydrosilylation reactions to produce a support coated by a silicone elastomer as a thin layer. These silicone compositions, when they are crosslinked, are suitable, inter alia, as coatings, for example for the protection or mechanical reinforcement of various textile substrates such as for example fibrous, woven, knitted or nonwoven supports. The targeted objective is to provide a silicone elastomer coating composition that can be crosslinked by polyaddition reactions and that is useful in particular for applications in the field of inflatable safety bags for vehicles, or airbags, having, after crosslinking, optimum properties in terms of adhesion, thinness, lightness and crease and abrasion resistance, but also good mechanical properties. This silicone coating composition should also be easy to use and to apply.

20 Claims, No Drawings

SILICONE COMPOSITION AND PROCESS USEFUL FOR IMPROVING THE CREASE RESISTANCE AND ABRASION RESISTANCE OF AIRBAGS, INTENDED FOR PROTECTING A VEHICLE OCCUPANT

CROSS-REFERENCE TO RELATED APPLICATIONS

This application is a National Stage entry of International Application No. PCT/FR2016/000146, filed Sep. 22, 2016, which claims priority to French Patent Application No. 1501993, filed Sep. 25, 2015.

BACKGROUND

Field of the Invention

The general field of the invention is that of silicone coating compositions, in particular those of the two-component or multi-component type, that can be crosslinked by polyaddition or hydrosilylation reactions to produce a support coated with a silicone elastomer as a thin layer. These silicone compositions, when they are crosslinked, are suitable, inter alia, as a coating, for example for protection or mechanical reinforcement of various textile substrates, for instance fibrous, woven, knitted or nonwoven supports.

Description of Related Art

Such silicone coatings are generally obtained by coating of the substrate and then curing resulting from the polyaddition of the unsaturated (alkenyl, e.g. Si-Vi) groups of an organopolysiloxane on hydrosilyl functions of the same or another organopolysiloxane.

These silicone compounds have found an important outlet in the coating of woven, knitted or nonwoven flexible materials, used for the manufacture of bags for individual protection of vehicle occupants, also known as airbags. The present invention also relates to the use of these silicone compositions in the manufacture of such protective bags.

Historically, the latter are formed by a cloth made of synthetic fiber, for example of polyamide (Nylon®), covered on at least one of its faces with a layer of an elastomer of the chloroprene type. The presence of such a protective layer or such a protective coating is dictated by the fact that the gases released by the gas generator (for example: carbon monoxide, NOx) in the event of impact are extremely hot and contain incandescent particles capable of damaging the Nylon® bag. The internal protective layer made of elastomer must be resistant to high temperatures and to mechanical stresses. It is also important for this elastomer coating to be in the form of a thin, uniform film that is perfectly adherent to the support made of synthetic fabric, forming the walls of the airbag.

Silicone compositions have readily taken over from chloroprenes in this application, since it has been found that the latter do not satisfactorily meet all the abovementioned specifications.

The use of mechanically and thermally more aggressive gas generators leads to additional stresses at the airbag seams. These stresses are in addition to the physical stresses associated with the deployment of the airbag and can produce tearing of the elastomer-coated fabric and opening of these seams. This results in a point of escape of hot gas, emanating from the generator, through the seams, causing points of weakness responsible for tearing, for combing (fraying) or even for rupturing of certain airbags. Thus, airbag manufacturers are always searching for precursor silicone compositions for silicone elastomers that are useful for coating woven, knitted or nonwoven fibrous supports and that exhibit excellent adhesion on the support after crosslinking and confer on it optimal mechanical properties, in particular good abrasion resistance, crease resistance, tear resistance and combing resistance (ability of the coated support to withstand combing of the airbag seams).

The term "nonwoven" is intended to mean any structure consisting of textile materials, such as fibers, continuous filaments or cut yarns, regardless of the nature or origin, formed into a net by any means, and linked by any means, excluding intertwining of yarns. Nonwoven textiles are products that have the appearance of porous textiles composed mainly of fibers and are produced by processes other than spinning, weaving, knitting or knotting.

Another constraint to which the elastomer coating is subject is that of aging resistance, i.e. the preservation over time of the thermal, mechanical and adhesion properties. This constraint is all the more acute since bags for individual protection are stored in folded form in motor vehicles, before their possible saving expansion in the event of an accident.

However, new constraints are currently emerging and require new solutions. Firstly, the durability of airbags must be guaranteed under circumstances where the constraints are more unfavorable. Thus, the demand is to supply silicone coating compositions which guarantee that the airbags obtained exhibit excellent abrasion resistance even under severe climatic conditions which are simulated by aging at high temperature and at high humidity, for example at 80° C. and at 95% relative humidity.

Secondly, the processes for manufacturing fabrics for the manufacture of airbags from synthetic fibers such as polyamides or polyesters, described in patent application EP-617881, comprise various operations which are preparation of the fiber blend, spinning and weaving, followed by various treatments, such as washing, drying and heat-setting of the fabric. During the preparation of the fiber blend and the spinning, sizing products or oils are commonly used to facilitate the glide of the fibers and of the yarns. Before or during the weaving step, a finishing treatment is often carried out on the yarn in order to ensure the cohesion of the fibers and form a protective sheath for the yarn in order to produce fabrics without any visual defect and preventing as far as possible any breaks and fraying. Other lubricating agents are regularly used during weaving for effective lubrication of needles and of mechanical elements in weaving looms and, consequently, the yarn entrained by the needles will convey a part of the lubricant that will be contained in the fabric. It is, among other things, in order to remove these sizing or finishing products or oils and the lubricating agents that one or more washing steps are carried out after the weaving step once the fabric is "directly off the loom" according to the terminology used by weavers. This washing step is followed by a step of drying the fabric, which is often carried out at the same time as a heat-treatment step also called "heat setting". It is known that, in weaving mills, the washing steps aimed at removing these sizing or finishing products or oils and the lubricating agents produce pollutant aqueous effluents which are contained in the aqueous waste. There is consequently an environmental challenge in being able to use fabrics obtained directly after weaving, also known as "directly off the loom", "raw" or "loomstate", which have undergone, after weaving, neither a washing or scouring step nor a heat-treatment or "heat-setting" step, for the manufacture of airbags. It is known, as described in patent application WO 2007/065885, that the presence of these sizing or finishing products or oils and the lubricating agents can reduce the adhesion performances of the silicone coating on the fabric and can consequently be detrimental in the airbag field. It is important for the silicone elastomer coating that is in the form of a thin and uniform film to be perfectly adherent to the woven or knitted fibrous support that has not undergone a washing or heat-setting step after weaving.

There is therefore a continuous need to improve the adhesion of the silicone elastomer on all types of woven and knitted fibrous support, and in particular on woven or knitted fibrous supports that have not undergone any washing step or heat-setting step after weaving. This adhesion must be maintained throughout, even under high temperature and humidity conditions.

The adhesion promoters used in the silicone compositions used for the airbag have been widely studied and various solutions are known to those skilled in the art.

Thus, U.S. Pat. No. 5,877,256 describes the use of an organosilicon compound comprising epoxy units as adhesion promoter. These organosilicon compounds may be silanes or siloxanes and may also contain other functional groups chosen from alkoxy, SiH and S-vinyl groups. U.S. Pat. No. 5,789,084 describes the use of an adhesion promoter comprising the organosilicon compounds described in U.S. Pat. No. 5,877,256 mentioned above and an organic titanium compound. Patent application EP-0681014 describes the use of an adhesion promoter consisting of an organosilicon compound comprising epoxy units, of an organic titanium compound and of a silane with alkoxy units. More recently, patent application EP 1 623 063 describes the use, as adhesion promoter, of a mixture comprising a silane with alkoxy and epoxy functions, butyl titanate and an organopolysiloxane having vinyl units in the chain and dimethylhydroxysilyl chain ends. U.S. Pat. No. 7,153,583 discloses an adhesion promoter system comprising an organosilicon compound comprising (meth)acryloxy groups.

There is still a need for silicone coating compositions for producing a silicone elastomer coating as a thin layer on a woven, knitted or nonwoven flexible material, used for the manufacture of bags for individual protection of vehicle occupants, also called airbags, which has adhesion performances that are sufficient to be satisfactorily used on fabrics obtained directly after weaving and not having undergone a washing or heat-setting step. These silicone elastomer coating compositions must at the same time exhibit optimal mechanical properties, in particular good tear resistance and combing resistance (ability of the coated fabric to withstand combing of the airbag seams).

Solutions have been envisioned for example in patent application WO 2007/065885 or in U.S. Pat. No. 7,581,568, but they remain specific to certain types of fabrics or of weaving looms. At the current time, there is no satisfactory technical solution which makes it possible to use woven or knitted fibrous supports, not having undergone a washing step or heat-setting step after weaving, in the airbag application.

SUMMARY

An objective of the present invention is to provide a silicone elastomer coating composition that can be crosslinked by polyaddition reactions, useful in particular for applications in the airbag field for vehicles, having after crosslinking optimal properties in terms of adhesion, thinness, lightness and crease and abrasion resistance, but also good mechanical properties. This silicone coating composition must also be easy to use and to apply.

Another of the objectives of the invention is to provide a process for improving the abrasion resistance of a woven, knitted or nonwoven fibrous support. This abrasion resistance must be optimal even under difficult environmental conditions, that is to say when the coated fibrous support is subjected to high temperature and humidity conditions.

Another of the essential objectives of the invention is to provide a process for improving the abrasion resistance of a woven or knitted fibrous support obtained directly off the weaving loom and not having undergone a washing step intended to remove the lubricating or sizing compositions used during the weaving, or a heat-setting step.

The invention also relates to a woven, knitted or nonwoven fibrous support, used for the manufacture of bags for individual protection of vehicle occupants, also called airbags, and also the process for obtaining these woven, knitted or nonwoven fibrous supports.

These fibrous supports obtained by means of the process according to the invention are used for the manufacture of airbags for vehicles, having not only optimal properties in terms of adhesion, thinness, lightness and crease and abrasion resistance, but also good combing resistance and tear resistance properties.

Another subject of the invention is a fibrous support coated with the abovementioned silicone composition or obtained according to the above process.

In addition, a final subject of the invention is an airbag comprising the woven or knitted fibrous support coated with the abovementioned silicone composition.

These objectives, among others, are achieved by the invention which consists of a silicone composition A comprising a silicone base B capable of crosslinking or curing by polyaddition and characterized in that it comprises an adhesion promoter system D comprising at least one organic titanium compound M and at least one additive X which is a linear organopolysiloxane comprising siloxyl units (I.1) to (I.3) having the formulae below:

    (I.1)

    (I.2)

    (I.3)

and not comprising units of formula (I.4):

    (I.4)

in which
a=1 and b=1 or 2
d=1 and e=1 or 2
the symbol Y represents a radical comprising a hydrocarbon-based group having from 2 to 20 carbon atoms and an epoxy function, with optionally one or more heteroatoms such as an oxygen atom, preferably the symbol Y is chosen from the radicals consisting of the group: alkyl glycidyl ether, linear, branched or cyclic epoxyalkyl, linear, branched or cyclic epoxyalkenyl and carboxylic acid glycidyl ester,
the symbols $Z^1$, $Z^2$ and $Z^3$, which may be identical or different, represent a monovalent hydrocarbon-based group having from 1 to 30 carbon atoms, preferably chosen from the group formed by alkyl groups having from 1 to 8 carbon atoms and aryl groups having from 6 to 12 carbon atoms, and even more preferentially chosen from the group consisting of a methyl, ethyl, propyl, 3,3,3-trifluoropropyl, xylyl, tolyl and phenyl group, with the condition according to which the additive X comprises, per molecule, at least two siloxyl units (I.1) bearing epoxyfunctional hydrocarbon-based groups and at least three siloxyl units (I.3) bearing hydrosiloxyl groups.

DETAILED DESCRIPTION OF A PREFERRED EMBODIMENT

After numerous tests, the applicant has been able to demonstrate that the use, in the silicone composition A, of an adhesion promoter system D comprising at least one organic titanium compound M and one additive X as defined above makes it possible to obtain an excellent abrasion and crease resistance of the fibrous support coated with this composition A.

The additive X has at least three Si—H bonds and acts as adhesion promoter and crosslinking agent. This organopolysiloxane is defined by very specific criteria. It is a linear organopolysiloxane of which all the siloxyl units in the chain are functionalized either with an Si—H unit (I-3) or with an Si-epoxy unit (I-2).

Preferably, the additive X does not contain alkoxy, vinyl, hydroxyl or methacryloxy functional groups.

Advantageously, the additive X has a total number of siloxyl units of between 7 and 30, preferably of between 7 and 25 and even more preferentially between 7 and 15.

It is the choice of the additive X in combination with the organic titanium compound M as adhesion promoter system in the composition A which makes it possible to obtain the desired good properties on the coated fibrous supports.

Furthermore, the improvement in the abrasion and crease resistance does not occur to the detriment of the other required properties, namely the hardness, the mechanical strength, the surface uniformity, and the heat resistance of the silicone coating.

Another advantage of the composition A according to the invention is that it can be used to coat woven or knitted fibrous supports obtained directly off the weaving loom and not having undergone a washing step intended to remove the lubricating or sizing compositions used during the weaving, or a heat-setting step.

In accordance with a preferred arrangement of the invention, the additive X has a molar ratio between the siloxyl units (I.1) and the siloxyl units (I.3) of between 0.5 and 4, preferably between 0.8 and 3 and even more preferentially between 0.8 and 2.5.

According to one preferential embodiment, the additive X consists of siloxyl units chosen from the siloxyl units (I.1) to (I.3) having the formulae below:

 (I.1)

 (I.2)

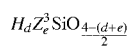 (I.3)

in which
a=1 and b=1 or 2
d=1 and e=1 or 2, and
the symbols Y, $Z^1$, $Z^2$ and $Z^3$ are as defined above.

According to another preferential embodiment, the additive X consists of siloxyl units chosen from the siloxyl units (I.1) to (I.3) having the formulae below:

 (I.1)

 (I.2)

 (I.3)

in which
a=1 and b=1 or 2,
d=1 and e=1, and
the symbols Y, $Z^1$, $Z^2$ and $Z^3$ are as defined above.

The additive X can be obtained by hydrosilylation of organic synthons, comprising at least one hydrocarbon-based ring in which is included an oxygen atom, by a linear organopolyhydrosiloxane not comprising units (I.4) as described previously. These hydrosilylation reactions can be catalyzed by platinum, in particular by carbon-supported platinum as described in patent EP 0 904 315 or by complexes of platinum with carbene ligands as described in EP 1 309 647. Preferably, the catalyst used will be a complex of platinum with carbene ligands since the hydrosilylation reaction is controlled better and the storage stability of the additive X obtained is improved.

Preferably, the additive X has a content of siloxyl units (I.1) of greater than or equal to 0.25 mol per 100 g of additive X and more preferentially of between 0.25 and 0.45 mol/100 g of additive X.

Even more advantageously, the additive X has a content of siloxyl units (I.1) of greater than or equal to 0.25 mol per 100 g of additive X and a content of siloxyl units (I.3) of greater than or equal to 0.3 mol per 100 g of additive X.

According to an even more advantageous embodiment, the additive X has a content of siloxyl units (I.1) of between 0.25 and 0.45 mol/100 g of additive X and a content of siloxyl units (I.3) of between 0.3 and 0.85 mol/100 g of additive X.

Preferably, the content of additive X in the composition A according to the invention is between 4% and 10% by weight of the composition A and even more preferentially between 5% and 9%.

Preferably, for the siloxyl unit (I.1), the symbol Y is chosen from the group consisting of the hydrocarbon-based groups (R-1) to (R-6) having the formulae below:

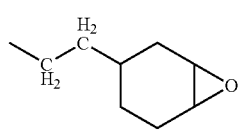 (R-1)

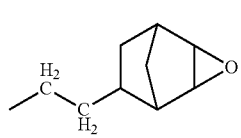 (R-2)

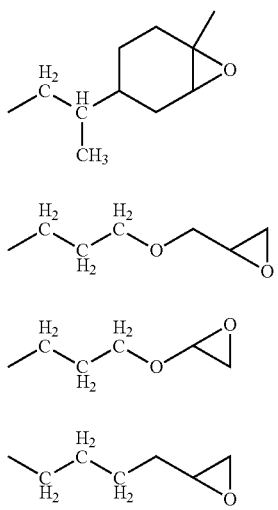

(R-3)

(R-4)

(R-5)

(R-6)

According to one particularly preferred embodiment, in the siloxyl unit (I.1), the symbol Y is the hydrocarbon-based group (R-4) having the formula below:

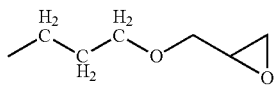

(R-4)

Regarding the other constituent of the adhesion promoter system D, the organic titanium compound M is a titanium chelate or a metal alkoxide of formula $Ti(OR)_4$ wherein R is chosen from linear or branched $C_1$-$C_8$ alkyl groups, alkoxyalkyl groups or acyl groups. Preferably, the organic titanium compound M is chosen from titanium alkylates, such as butyl titanate, isopropyl titanate, methyl titanate and octyl titanate. More preferentially, the organic titanium compound M is butyl titanate.

The content of organic titanium compound M in the silicone composition A according to the invention can be between 0.2% and 1.5% by weight of the composition A, preferably between 0.4% and 1%.

According to another embodiment, the adhesion promoter system D of the composition A also comprises an organosilane G comprising at least one epoxy radical.

Preferably, the organosilane G is chosen from the products corresponding to general formula (VII) below:

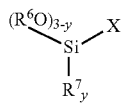

(VII)

in which formula:
$R^6$ is a linear or branched $C_1$-$C_4$ alkyl radical,
$R^7$ is a linear or branched $C_1$-$C_4$ alkyl radical,
y is equal to 0, 1, 2 or 3, and X being defined by formula (VIII) below:

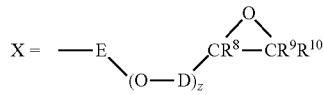

(VIII)

with:
E and D, which are identical or different radicals, chosen from linear or branched $C_1$-$C_4$ alkyls,
z is equal to 0 or 1,
$R^8$, $R^9$ and $R^{10}$, which are identical or different radicals, representing hydrogen or a linear or branched $C_1$-$C_4$ alkyl radical, and
$R^8$ and $R^9$ or $R^{10}$ possibly alternatively constituting, together and with the two carbons bearing the epoxy, a 5- to 7-membered alkyl ring.

According to one especially preferred embodiment, the organosilane G is chosen from the group consisting of: 3-glycidoxypropyltrimethoxysilane (GLYMO), 3-glycidoxypropyltriethoxysilane (C1770), 3-glycidoxypropylmethyldimethoxysilane, 3-glycidoxypropylmethyldiethoxysilane, 3-glycidoxypropyldimethylethoxysilane, 2-(3,4-epoxycyclohexyl)ethyltriethoxysilane, 2-(3,4-epoxycyclohexyl)ethyltrimethoxysilane, 3,4-epoxycyclohexylethyltrimethoxysilane, 5,6-epoxyhexyltriethoxysilane and mixtures thereof.

If it is present in the composition A, a content of 0.5% to 3% by weight of organosilane G in the composition A can advantageously be used.

In accordance with a preferred arrangement of the invention, the concentration of epoxy units in the composition A is between 10 and 60 mmol per 100 g of composition A and preferably between 15 and 40 mmol per 100 g of composition A.

In order to vary the concentration of epoxy units in the composition A, it is possible to vary the concentration of additive X in the composition A, to vary the number of units (I.1) of the additive X or to add a variable amount of organosilane G.

Preferably, the silicone base B comprises:
at least one organopolysiloxane E having, per molecule, at least two $C_2$-$C_{12}$ alkenyl groups each bonded to a different silicon atom,
at least one organopolysiloxane resin F comprising from 0.1% to 20% by weight of $C_2$-$C_6$ alkenyl groups each bonded to a different silicon atom,
optionally at least one organohydropolysiloxane H having, per molecule, at least two hydrogen atoms each bonded to a different silicon atom, and preferably at least three hydrogen atoms each bonded to a different silicon atom,
an effective amount of a polyaddition catalyst C which is a metal or metal compound of the platinum group,
at least one inhibitor I, and
optionally at least one filler J.

According to one preferential embodiment, the silicone base B comprises at least one filler J.

For the entire application, and according to the nomenclature widely known in silicone chemistry, the MDTQ siloxyl units represent:
M=siloxyl unit of formula $R_3SiO_{1/2}$
D=siloxyl unit of formula $R_2SiO_{2/2}$
T=siloxyl unit of formula $RSiO_{3/2}$ and
Q=siloxyl unit of formula $SiO_{4/2}$,
wherein the radicals R, which may be identical or different, are monovalent groups.

All the viscosities under consideration in the present description correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

According to one preferred embodiment, the organopolysiloxane E comprises:
(i) at least two units of formula (E1):

$$Y_a Z_b SiO_{(4-(a+b))/2} \quad (E1)$$

in which:
Y represents a monovalent radical containing from 2 to 12 carbon atoms, having at least one alkene function,
Z represents a monovalent radical containing from 1 to 20 carbon atoms and does not comprise an alkene function;
a and b represent integers, a being 1, 2 or 3, b being 0, 1 or 2 and (a+b) being 1, 2 or 3;
(ii) and optionally other units of formula (E2):

$$Z_c SiO_{(4-c)/2} \quad (E2)$$

in which:
Z has the same meaning as above, and
c represents an integer which is 0, 1, 2 or 3.

It is understood in formulae (E1) and (E2) above that, if several radicals Y and Z are present, they may be identical to or different than one another.

In formula (E1), the symbol a can preferentially be 1 or 2, more preferentially 1. Furthermore, in formulae (E1) and (E2), Z can preferentially represent a monovalent radical chosen from the group consisting of an alkyl group having 1 to 8 carbon atoms, optionally substituted with at least one halogen atom, and an aryl group, and even more preferentially Z can represent a monovalent radical chosen from the group consisting of methyl, ethyl, propyl, 3,3,3-trifluoropropyl, xylyl, tolyl and phenyl. In addition, in formula (E1), Y may advantageously represent a radical chosen from the group consisting of vinyl, propenyl, 3-butenyl, 5-hexenyl, 9-decenyl, 10-undecenyl, 5,9-decadienyl and 6,11-dodecadienyl. Preferably, in formulae (E1) and (E2) above, the symbol Y is a vinyl and the symbol Z is a methyl.

The organopolysiloxane E can preferably have a linear, optionally cyclic, structure. When they are linear organopolysiloxanes, they can essentially consist:
of siloxyl units "D" chosen from the units of formulae $Y_2SiO_{2/2}$, $YZSiO_{2/2}$ and $Z_2SiO_{2/2}$;
of siloxyl units "M" chosen from the units of formulae $Y_3SiO_{1/2}$, $Y_2ZSiO_{1/2}$, $YZ_2SiO_{1/2}$ and $Z_3SiO_{2/2}$.

By way of examples of units "D", mention may be made of dimethylsiloxy, methylphenylsiloxy, methylvinylsiloxy, methylbutenylsiloxy, methylhexenylsiloxy, methyldecenylsiloxy and methyldecadienylsiloxy groups.

By way of example of units "M", mention may be made of trimethylsiloxy, dimethylphenylsiloxy, dimethylvinylsiloxy and dimethylhexenylsiloxy groups.

These linear organopolysiloxanes may be oils having a dynamic viscosity at 25° C. of between 1 mPa·s and 120 000 mPa·s and more preferentially between 10 mPa·s and 100 000 mPa·s.

When the organopolysiloxane is a cyclic organopolysiloxane, it can consist of siloxyl units "D" chosen from the units of formulae $Y_2SiO_{2/2}$, $YZSiO_{2/2}$ and $Z_2SiO_{2/2}$. Examples of such units "D" are described above. This cyclic organopolysiloxane can have a dynamic viscosity at 25° C. of between 1 mPa·s and 5000 mPa·s.

Examples of organopolysiloxane E are:
polydimethylsiloxanes comprising dimethylvinylsilyl end groups;
poly(methylphenylsiloxane-co-dimethylsiloxane)s comprising dimethylvinylsilyl end groups;
poly(vinylmethylsiloxane-co-dimethylsiloxane)s comprising dimethylvinylsilyl end groups;
poly(dimethylsiloxane-co-vinylmethylsiloxane)s comprising trimethylsilyl end groups;
cyclic polymethylvinylsiloxanes.

The silicone resin F is a silicone resin comprising from 0.1% to 20% by weight, preferentially from 4% to 20% by weight, of $C_2$-$C_6$ alkenyl groups bonded to silicon atoms. The alkenyl groups may be located on siloxyl units M, D or T. These resins can be prepared for example according to the process described in U.S. Pat. No. 2,676,1820. Preferably, the alkenyl groups are chosen from vinyls, allyls and hexenyls.

For example, the silicone resin F can comprise:
at least two different siloxyl units chosen from those of formulae (F1) and (F2) below:

$$W_a Z'_b SiO_{(4-(a+b))/2} \quad (F1)$$

in which:
the symbols W, which may be identical or different, each represent a $C_2$-$C_6$ alkenyl group; preferably, a vinyl, allyl and/or hexenyl group and even more preferentially a vinyl group,
the symbols Z', which may be identical or different, each represent a monovalent hydrocarbon-based group chosen from alkyl groups having from 1 to 8 carbon atoms inclusive, such as methyl, ethyl, propyl and 3,3,3-trifluoropropyl groups, cycloalkyl groups, such as cyclohexyl, cycloheptyl and cyclooctyl groups, and aryl groups such as xylyl, tolyl and phenyl groups, and
the symbol a is equal to 1 or 2, preferably 1, the symbol b is equal to 0, 1 or 2, and the sum a+b is equal to 1, 2 or 3,
and optionally units having the formula below:

$$Z'_c SiO_{(4-c)/2} \quad (F2)$$

in which Z' has the same meaning as above and the symbol c is equal to 0, 1, 2 or 3, and
with the condition that at least one of the units (F1) or (F2) is a unit T or Q.

In one preferred embodiment of the invention, the silicone resin Z comprises at least two vinyl radicals and is chosen from the group consisting of the following silicone resins:
$MD^{Vi}Q$ wherein the vinyl groups are included in the units D,
$MD^{Vi}TQ$ wherein the vinyl groups are included in the units D,
$MM^{Vi}Q$ wherein the vinyl groups are included in some of the units M,
$MM^{Vi}TQ$ wherein the vinyl groups are included in some of the units M,
$MM^{Vi}DD^{Vi}Q$ wherein the vinyl groups are included in some of the units M and D,
and mixtures thereof,
with:
$M^{Vi}$=siloxyl unit of formula $(R_2)(vinyl)SiO_{1/2}$
$D^{Vi}$=siloxyl unit of formula $(R)(vinyl)SiO_{2/2}$
and the groups R, which may be identical or different, are monovalent hydrocarbon-based groups chosen from alkyl groups having from 1 to 8 carbon atoms inclusive, such as methyl, ethyl, propyl and 3,3,3-trifluoropropyl groups, and aryl groups such as xylyl, tolyl and phenyl groups. Preferably, the groups R are methyls.

Preferably, the silicone resin F has the formula $MD^{vi}Q$ or $MM^{vi}Q$ as described above.

According to one embodiment of the invention, the silicone resin F is present in the composition A up to 40% by weight relative to the total weight of the composition A, preferably between 3% and 30% by weight relative to the total weight of the composition A and more preferentially between 5% and 30% and more preferentially still between 10% and 30%.

The organohydropolysiloxane H according to the invention comprises at least two, and preferably three, hydrogen atoms each bonded to different silicon atoms. According to one preferred embodiment, this organohydropolysiloxane B comprises:
(i) at least two units of formula (H1), and preferably at least three units of formula (H1):

in which:
L represents a monovalent radical other than a hydrogen atom,
H represents a hydrogen atom,
d and e represent integers, d being 1 or 2, e being 0, 1 or 2 and (d+e) being 1, 2 or 3;
and optionally other units of formula (H2):

in which:
L has the same meaning as above, and
f represents an integer which is 0, 1, 2 or 3.

It is understood in formulae (H1) and (H2) above that, if several groups L are present, they may be identical to or different than one another. In formula (H1), the symbol d may preferentially be equal to 1. Furthermore, in formula (H1) and in formula (H2), L may preferably represent a monovalent radical chosen from the group formed by an alkyl group having 1 to 8 carbon atoms, optionally substituted with at least one halogen atom, and an aryl group. L may advantageously represent a monovalent radical chosen from the group formed by methyl, ethyl, propyl, 3,3,3-trifluoropropyl, xylyl, tolyl and phenyl. Examples of units of formula (H1) are the following: $H(CH_3)_2SiO_{1/2}$, $H(CH3)SiO_{2/2}$ and $H(C_6H_5)SiO_{2/2}$.

The organohydropolysiloxane H may have a linear, branched, cyclic or network structure. When it is a question of linear organohydropolysiloxanes, they can essentially consist:
of siloxyl units "D" chosen from the units of formulae $HLSiO_{2/2}$ and $L_2SiO_{2/2}$; and
of siloxyl units "M" chosen from the units of formulae $HL_2SiO_{1/2}$ and $L_3SiO_{2/2}$, with the symbol L having the same meaning as above and the symbol H denoting a hydrogen atom.

These linear organohydropolysiloxanes may be oils having a dynamic viscosity at 25° C. of between 1 mPa·s and 100 000 mPa·s, preferentially between 1 mPa·s and 5000 mPa·s, and even more preferentially between 1 mPa·s and 2000 mPa·s.

When they are cyclic organohydropolysiloxanes, they may consist of siloxyl units "D" chosen from the units of formulae $HLSiO_{2/2}$ and $L_2SiO_{2/2}$, or of siloxyl units of formula $HLSiO_{2/2}$ only. The units of formula $L_2SiO_{2/2}$ may in particular be dialkylsiloxy units or alkylarylsiloxy units. These cyclic organohydropolysiloxanes can have a dynamic viscosity at 25° C. of between 1 mPa·s and 5000 mPa·s.

Examples of organohydropolysiloxane B are:
polydimethylsiloxanes comprising hydrodimethylsilyl end groups;
poly(dimethylsiloxane-co-hydromethylsiloxane)s comprising trimethylsilyl end groups;
poly(dimethylsiloxane-co-hydromethylsiloxane)s comprising hydrodimethylsilyl end groups;
polyhydromethylsiloxanes comprising trimethylsilyl end groups;
cyclic hydromethylpolysiloxanes.

When they are branched or network organohydropolysiloxanes, they can also comprise:
siloxyl units "T" chosen from the units of formulae $HSiO_{3/2}$ and $LSiO_{3/2}$;
siloxyl units "Q" of formula $SiO_{4/2}$,
with the symbol H representing a hydrogen atom and L having the same meaning as above.

In the composition A, the molar ratio of the number of hydrogen atoms bonded to the silicon in the organohydropolysiloxane H and the additive X to the number of alkenyl groups of the organopolysiloxane E and of the resin F is between 0.5 and 8, preferably between 1 and 6 and even more preferentially between 1 and 5.

According to one preferred embodiment of the invention, in the composition A the molar ratio between the SiH units provided by the additive X and the organohydropolysiloxane H when it is present and the epoxy units provided by the additive X and the organosilane G when it is present is between 1 and 3.

As polyaddition catalyst C that is useful according to the invention, mention may be made of the compounds of a metal belonging to the platinum group well known to those skilled in the art. The metals of the platinum group are those known as platinoids, a name which groups together, in addition to platinum, ruthenium, rhodium, palladium, osmium and iridium. The compounds of platinum and of rhodium are preferably used. Use may in particular be made of the complexes of platinum and of an organic product described in U.S. Pat. No. 3,159,601, U.S. Pat. No. 3,159,602 and U.S. Pat. No. 3,220,972 and European patents EP-A-0 057 459, EP-A-0 188 978 and EP-A-0 190 530, and the complexes of platinum and of vinyl organosiloxanes described in U.S. Pat. No. 3,419,593. The catalyst generally preferred is platinum. By way of examples, mention may be made of black platinum, chloroplatinic acid, a chloroplatinic acid modified with an alcohol, a complex of chloroplatinic acid with an olefin, an aldehyde, a vinylsiloxane or an acetylenic alcohol, among others. The Karstedt solution or complex, as described in U.S. Pat. No. 3,775,452, chloroplatinic acid hexahydrate or a platinum catalyst comprising carbene ligands is preferred.

Preferably, the platinum concentration in the silicone composition is between 5 and 80 ppm by weight and even more preferentially between 10 and 50 ppm by weight.

The hydrosilylation reaction inhibitor I that is useful according to the invention can be chosen from α-acetylenic alcohols, α-α'-acetylenic diesters, ene-yne conjugated compounds, α-acetylenic ketones, acrylonitriles, maleates, fumarates and mixtures thereof. These compounds capable of performing the hydrosilylation inhibitor function are well known to those skilled in the art. They can be used alone or as mixtures.

An inhibitor I of α-acetylenic alcohol type can be chosen from the compounds of formula (Ia) below:

$$(R^1)(R^2)C(OH)-C≡CH \qquad (Ia)$$

in which:
the group $R^1$ represents an alkyl group, a cycloalkyl group, a (cycloalkyl)alkyl group, an aryl group or an arylalkyl group,
the group $R^2$ represents a hydrogen atom, an alkyl group, a cycloalkyl group, a (cycloalkyl)alkyl group, an aryl group or an arylalkyl group,
or else $R^1$ and $R^2$ constitute, together with the carbon atom to which they are bonded, a 5-, 6-, 7- or 8-membered aliphatic ring, optionally substituted one or more times. According to formula (D1):
the term "alkyl" is intended to mean a saturated hydrocarbon-based chain containing from 1 to 20 carbon atoms and preferably from 1 to 8 carbon atoms. An alkyl group may be chosen from the group consisting of methyl, ethyl, isopropyl, n-propyl, tert-butyl, isobutyl, n-butyl, n-pentyl, isoamyl and 1,1-dimethylpropyl;
according to the invention, the term "cycloalkyl" is intended to mean a saturated monocyclic or polycyclic, preferably monocyclic or bicyclic, hydrocarbon-based group containing from 3 to 20 carbon atoms, preferably from 5 to 8 carbon atoms. When the cycloalkyl group is polycyclic, the multiple cyclic nuclei may be attached to each other via a covalent bond and/or via a spirane atom and/or may be fused with each other. A cycloalkyl group may be chosen from the group consisting of cyclopropyl, cyclobutyl, cyclopentyl, cyclohexyl, cycloheptyl, cyclooctyl, adamantane and norbornane;
the term "(cycloalkyl)alkyl" is intended to mean according to the invention a cycloalkyl group as defined above bonded to an alkyl group also as defined above;
the term "aryl" is intended to mean according to the invention a monocyclic or polycyclic aromatic hydrocarbon-based group containing from 5 to 18 carbon atoms. An aryl group may be chosen from the group consisting of phenyl, naphthyl, anthracenyl and phenanthryl;
the term "arylalkyl" is intended to mean according to the invention an aryl group as defined above bonded to an alkyl group also as defined above.

According to one preferred embodiment, in formula (Ia), $R^1$ and $R^2$ constitute, together with the carbon atom to which they are bonded, an unsubstituted 5-, 6-, 7- or 8-membered aliphatic ring. According to another preferred embodiment, $R^1$ and $R^2$, which may be identical or different, represent, independently of one another, a $C_1$ to $C_{12}$, preferably $C_1$ to $C_6$, monovalent alkyl group.

An inhibitor I which is an α-acetylenic alcohol that is useful according to the invention can be chosen from the group consisting of the following compounds: 1-ethynyl-1-cyclopentanol; 1-ethynyl-1-cyclohexanol (also called ECH); 1-ethynyl-1-cycloheptanol; 1-ethynyl-1-cyclooctanol; 3-methyl-1-butyn-3-ol (also called MBT); 3-methyl-1-pentyn-3-ol; 3-methyl-1-hexyn-3-ol; 3-methyl-1-heptyn-3-ol; 3-methyl-1-octyn-3-ol; 3-methyl-1-nonyn-3-ol; 3-methyl-1-decyn-3-ol; 3-methyl-1-dodecyn-3-ol; 3-methyl-1-pentadecyn-3-ol; 3-ethyl-1-pentyn-3-ol; 3-ethyl-1-hexp-3-ol; 3-ethyl-1-heptyn-3-ol; 3,5-dimethyl-1-hexp-3-ol; 3-isobutyl-5-methyl-1-hexyn-3-ol; 3,4,4-trimethyl-1-pentyn-3-ol; 3-ethyl-5-methyl-1-heptyn-3-ol; 3,6-diethyl-1-nonyn-3-01; 3,7,11-trimethyl-1-dodecyn-3-ol (also called TMDDO); 1,1-diphenyl-2-propyn-1-ol; 3-butyn-2-ol; 1-pentyn-3-ol; 1-hexyn-3-ol; 1-heptyn-3-ol; 5-methyl-1-hexp-3-ol; 4-ethyl-1-octyn-3-ol and 9-ethynyl-9-fluorenol, and mixtures thereof.

An inhibitor I of α-α'-acetylenic diester type can be chosen from the compounds of formula (Ib) below:

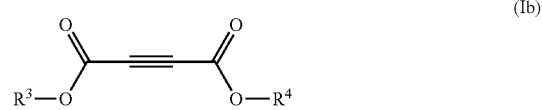

in which the groups $R^3$ and $R^4$, which may be identical or different, represent, independently of one another, an alkyl group, a cycloalkyl group, a (cycloalkyl)alkyl group, an aryl group, an arylalkyl group or a silyl group.
The term "silyl" is intended to mean according to the invention a group of formula —$SiR_3$, each R independently representing an alkyl group containing from 1 to 20 carbon atoms, preferably from 1 to 8 carbon atoms. A silyl group can for example be the trimethylsilyl group.

According to one particular embodiment, in formula (Ib), $R^3$ and $R^4$, which may be identical or different, independently represent a $C_1$ to $C_{12}$, preferably $C_1$ to $C_6$, alkyl group or the trimethylsilyl group. An inhibitor I which is an α-α'-acetylenic diester that is useful according to the invention can be chosen from the group consisting of the following compounds: dimethyl acetylenedicarboxylate (DMAD), diethyl acetylenedicarboxylate, tert-butyl acetylenedicarboxylate and bis(trimethylsilyl) acetylenedicarboxylate.

An inhibitor I of ene-yne conjugated compound type can be chosen from the compounds of formula (Ic) below:

in which:
the groups $R^5$, $R^6$ and $R^7$ represent, independently of one another, a hydrogen atom, an alkyl group, a cycloalkyl group, a (cycloalkyl)alkyl group, an aryl group or an arylalkyl group,
or else at least two groups among the groups $R^5$, $R^6$ and $R^7$ constitute, together with the carbon atom(s) to which they are bonded, a 5-, 6-, 7- or 8-membered aliphatic ring, optionally substituted one or more times.
According to one particular embodiment, the groups $R^5$, $R^6$ and $R^7$ represent, independently of one another, a hydrogen atom, a $C_1$ to C12, preferably $C_1$ to C6, alkyl group or an aryl group. An inhibitor I which is an ene-yne conjugated compound that is useful according to the invention can be chosen from the group consisting of the following compounds: 3-methyl-3-penten-1-yne; 3-methyl-3-hexen-1-yne; 2,5-dimethyl-3-hexen-1-yne; 3-ethyl-3-buten-1-yne; and 3-phenyl-3-buten-1-yne. According to another particular embodiment, two groups chosen from the groups $R^5$, $R^6$ and $R^7$ constitute, together with the carbon atom(s) to which they are bonded, an unsubstituted 5-, 6-, 7- or 8-membered aliphatic ring and the remaining third group represents a hydrogen atom or a $C_1$ to C12, preferably $C_1$ to C6, alkyl group. An inhibitor I which is an ene-yne conjugated compound that is useful according to the invention may be 1-ethynyl-1-cyclohexene.

An inhibitor I of α-acetylenic ketone type can be chosen from the compounds of formula (Id) below:

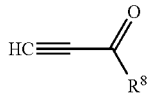

(Id)

in which $R^8$ represents an alkyl group, a cycloalkyl group, a (cycloalkyl)alkyl group, an aryl group or an arylalkyl group, it being possible for the alkyl, cycloalkyl, (cycloalkyl)alkyl, aryl or arylalkyl groups to optionally be substituted one or more times with a chlorine, bromine or iodine atom. According to one preferred embodiment, $R^8$ represents a $C_1$ to $C_{12}$, preferably $C_1$ to $C_6$, monovalent alkyl group, optionally substituted one or more times with a chlorine or bromine atom, or a cycloalkyl group, or an aryl group. An inhibitor I which is an α-acetylenic ketone that is useful according to the invention can be chosen from the group consisting of the following compounds: 1-octyn-3-one, 8-chloro-1-octyn-3-one, 8-bromo-1-octyn-3-one, 4,4-dimethyl-1-octyn-3-one, 7-chloro-1-heptyn-3-one, 1-hexyn-3-one, 1-pentyn-3-one, 4-methyl-1-pentyn-3-one, 4,4-dimethyl-1-pentyn-3-one, 1-cyclohexyl-1-propyn-3-one, benzoacetylene and o-chlorobenzoylacetylene.

An inhibitor I of acrylonitrile type can be chosen from the compounds of formula (Ie) below:

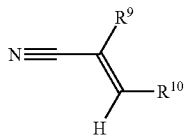

(Ie)

in which $R^9$ and $R^{10}$ represent, independently of one another, a hydrogen atom, a chlorine, bromine or iodine atom, an alkyl group, a cycloalkyl group, a (cycloalkyl)alkyl group, an aryl group or an arylalkyl group, it being possible for the alkyl, cycloalkyl, (cycloalkyl)alkyl, aryl or arylalkyl groups to optionally be substituted one or more times with a chlorine, bromine or iodine atom. An inhibitor I which is an acrylonitrile that is useful according to the invention can be chosen from the group consisting of the following compounds: acrylonitrile, methacrylonitrile, 2-chloroacrylonitrile; crotononitrile and cinnamonitrile.

An inhibitor I of maleate or fumarate type can be chosen from the compounds of formulae (If) and (Ig) below:

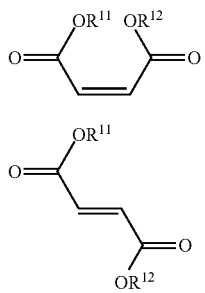

(If)

(Ig)

in which $R^{11}$ and $R^{12}$, which may be identical or different, represent, independently of one another, an alkyl or alkenyl group, a cycloalkyl group, a (cycloalkyl)alkyl group, an aryl group or an arylalkyl group, said alkyl, alkenyl, cycloalkyl, (cycloalkyl)alkyl, aryl and arylalkyl groups possibly being substituted with an alkoxy group.

The term "alkenyl" is intended to mean according to the invention a saturated hydrocarbon-based chain containing from 1 to 20 carbon atoms, preferably from 1 to 8 carbon atoms, and comprising at least one double unsaturation. An alkenyl group can be chosen from the group consisting of vinyl or allyl.

The term "alkoxy" is intended to mean, according to formula (If) or (Ig), an alkyl group as defined above bonded to an oxygen atom. An alkoxy group can be chosen from the group consisting of methoxy, ethoxy, propoxy and butoxy.

According to one particular embodiment, $R^{11}$ and $R^{12}$, which may be identical or different, represent, independently of one another, a $C_1$ to $C12$, preferably $C_1$ to C6, alkyl or alkenyl group optionally substituted with a $C_1$ to C6 alkoxy group.

An inhibitor I which is a maleate or a fumarate that is useful according to the invention can be chosen from the group consisting of diethyl fumarate, diethyl maleate, diallyl fumarate, diallyl maleate and bis(methoxyisopropyl) maleate.

Inhibitors I chosen from α-acetylenic alcohols, α-α'-acetylenic diesters, ene-yne conjugated compounds, α-acetylenic ketones, acrylonitriles, maleates and fumarates are commercially available. Mention may in particular be made of 1-ethynyl-1-cyclohexanol (also called ECH) which is commercially available from BASF, dimethyl maleate which is commercially available from DMS and dimethyl acetylenedicarboxylate which is available from City Chemical LLC.

These inhibitors I are added in a weight amount of between 1 and 50 000 ppm relative to the weight of the silicone composition A, in particular between 10 and 10 000 ppm and preferably between 20 and 2000 ppm.

As filler J, use may be made of mineral fillers which are very finely divided products, the average particle diameter of which is less than 0.1 μm. These mineral fillers can be chosen from siliceous materials. The reinforcing siliceous fillers are chosen from colloidal silicas, powders of fumed silica and of precipitated silica, or a mixture thereof. These powders have an average particle size of generally less than 0.1 μm and a BET specific surface area of greater than 50 m²/g, preferably between 150 and 350 m²/g. These silicas may be incorporated in unmodified form or after having been treated with organosilicon compounds usually used for this purpose. Among these compounds are methylpolysiloxanes such as hexamethyldisiloxane, octamethylcyclotetrasiloxane, methylpolysilazanes such as hexamethyldisilazane, hexamethylcyclotrisilazane, chlorosilanes such as dimethyldichlorosilane, trimethylchlorosilane, methylvinyldichlorosilane, dimethylvinylchlorosilane, alkoxysilanes such as dimethyldimethoxysilane, dimethylvinylethoxysilane, trimethylmethoxysilane. Semi-reinforcing siliceous fillers such as diatomaceous earths or ground quartz may also be used.

In addition to or instead of the reinforcing silicas, semi-reinforcing or bulking mineral fillers may be added. Examples of these non-siliceous fillers that can be used alone or as a mixture are calcium carbonate, optionally surface-treated with an organic acid or with an organic acid ester, calcined clay, titanium oxide of the rutile type, iron oxide, zinc oxide, chromium oxide, zirconium oxide, magnesium oxide, the various forms of alumina (hydrated or non-hydrated), boron nitride, lithopone, barium metaborate, barium sulfate and glass microbeads. These fillers are more coarse with generally a mean particle diameter of greater than 0.1 µm and a specific surface area of generally less than 30 m²/g. These fillers may have been surface-modified by treatment with the various organosilicon compounds normally used for this purpose.

When it is present, the amount of filler J present in the composition A is from 5% to 50% by weight relative to the total weight of composition A, preferably from 5% to 40% and even more preferentially from 10% to 30%.

The composition A may also contain a non-functionalized organopolysiloxane K which is in particular free of alkenyl or hydrosilyl functions. Preferably, the non-functionalized organosiloxane K is linear or substantially linear. It is preferably a question of α,ω-bis(triorganosiloxy)diorganopolysiloxane polymers having viscosities of at least 10 mPa·s, formed essentially from diorganosiloxy units, the organic radicals bonded to the silicon atoms being chosen from methyl and phenyl radicals. The viscosity of these polymers can reach 10 million mPa·s at 25° C. They therefore include oils with a fluid to viscous appearance and gums. These organopolysiloxanes are commercial products, for instance the products of the Bluesil®47V range (for example 47V50, 47V100, 47V500, 47V500, 47V12500 or 47V30000) from the company Bluestar Silicones France, and are widely disclosed both with regard to their structures and with regard to their syntheses in the technical literature. When they are gums, the viscosity is at least equal to 600 000 mPa·s.

The term "gum" is used for organosilicic compounds having viscosities conventionally greater than 600 000 mPa·s, which corresponds to a molecular weight of greater than 260 000 g/mol. The consistency or penetrability of a gum is determined at 25° C. by means of a penetrometer of PNR12 type or equivalent model which makes it possible to apply a cylindrical head, under standardized conditions, to the sample. The penetrability of a gum is the depth, expressed in tenths of millimeters, to which a calibrated cylinder penetrates into the sample over the course of one minute. These polymers which act as plasticizers can be introduced in a proportion of at most 40 parts by weight, preferably from 1 to 20 parts by weight, per 100 parts by weight of silicone composition A.

To improve its stability, the composition A may also comprise a stabilizing additive. Mention may for example be made of silylated derivatives of phosphoric acid, such as phosphoric acid silyl esters.

The composition A according to the invention may also comprise a coloring additive or a coloring base.

The composition A may also comprise an additive for improving fire resistance. As additive for improving fire resistance, mention may for example be made of compounds comprising a phenyl group substituted with a (secondary or tertiary) amino group. Examples of such additives are found in reference U.S. Pat. No. 5,516,938. The useful amounts of such additives are generally between 0.01 and 1 part by weight relative to the total amount of the composition.

According to another embodiment, the composition A does not comprise vinyltrimethoxysilane.

According to another of its aspects, the present invention relates to a two-component precursor system for the composition A according to the invention and as described above which is in two distinct parts A1 and A2 intended to be mixed so as to form the composition A, characterized in that one of these parts contains the catalyst C while the other part contains the additive X and the organohydropolysiloxane H.

A further characteristic of this precursor system is that the resin F can be used in the part A1 or the part A2 or in the two parts A1 and A2. The catalyst C must not be present in the part A1 or A2 containing the additive X and the organohydropolysiloxane H.

The viscosity of the parts A1 and A2 and of the mixture thereof can be adjusted by adjusting the amounts of the constituents and by selecting organopolysiloxanes of different viscosities. Once mixed together, the parts A1 and A2 form a ready-to-use silicone composition A which can be applied to the fibrous support by coating, transfer, etching or impregnation. Preferably, the silicone composition A will be applied to the fibrous support by coating with any suitable coating means, for example a scraper or a roll. A final deposited thickness after crosslinking of between 25 and 300 µm, in particular between 50 and 200 µm, will in general be targeted. The compositions according to the invention are crosslinked thermally and/or by electromagnetic radiation.

The invention also relates to the silicone elastomer that can be obtained by crosslinking and/or curing the silicone composition A according to the invention and as described above.

The silicone compositions according to the invention can be used for covering or coating flexible supports, in particular woven, knitted or nonwoven fibrous textile supports, and preferably woven or knitted supports made of synthetic fibers, advantageously of polyester or of polyamide.

The present invention also relates to a process for preparing a fibrous support coated with a silicone elastomer, comprising the following steps:

a) preparing a silicone composition A according to the invention and as defined above, b) applying onto one or two faces of a fibrous support at least 10 g/m² of the silicone composition A prepared in step a), and c) crosslinking the deposit formed in step b) so as to form an elastomer by heating at a temperature that can reach 210° C., for example through the action of electromagnetic radiation or hot air.

In general, the coating in question here can correspond to the depositing of a single layer onto at least one of the faces of the fibrous support (primary coating). However, it may also involve the depositing of a second layer or optionally of a third layer onto at least one of the faces of the already coated fibrous support (secondary coating) so as to have, in total, the desired thickness guaranteeing the best possible performances.

In step b) of the process according to the invention, the silicone composition A can be applied by any suitable coating means, for example using a scraper or a roll. Preferably, in step b), an amount of composition A of from 10 to 150 g/m² of fibrous support, preferentially from 10 to 100 g/m² and even more preferentially from 10 to 60 g/m² is applied.

In step c) of the process according to the invention, the crosslinking of the composition applied onto the fibrous support can be brought about thermally and/or by electromagnetic radiation, preferably by infrared radiation. The crosslinking temperature is for example from 120 to 200° C. for a period of less than 5 minutes.

The fibrous support of the invention may be of natural, artificial and/or synthetic origin. It may be a woven, knitted or nonwoven fibrous support. When it is a woven or knitted fibrous support, that is to say a fabric or a knit, the yarns are advantageously based on thermoplastic polymer. By way of example, mention may be made, as thermoplastic (co) polymers suitable in the context of the invention, of: polyolefins, polyesters, alkylene polyoxides, polyoxyalkylenes, polyhaloalkylenes, poly(alkylene-phthalate or terephthalate)s, poly(phenyl or phenylene)s, poly(phenylene oxide or sulfide), polyvinyl acetates, polyvinyl alcohols, polyvinyl halides, polyvinylidene halides, polyvinyl nitriles, polyamides, polyimides, polycarbonates, polysiloxanes, polymers of acrylic or methacrylic acid, polyacrylates or methacrylates, natural polymers, namely cellulose and its derivatives, synthetic polymers such as synthetic elastomers, or thermoplastic copolymers comprising at least one monomer identical to any one of the monomers included in the abovementioned polymers, and also the blends and/or alloys of all these (co)polymers.

When the fibrous support is made of a thermoplastic polymer, it is preferably made of polyester, such as polyethylene terephthalate (PET), polypropylene terephthalate (PPT), polybutylene terephthalate (PBT), copolymers thereof and mixtures thereof, or made of polyamide such as polyamide 6, polyamide 6.6, polyamide 4, polyamide 1.1, polyamide 1.2, polyamides 4-6, 6-10, 6-12, 6-36, 12-12, copolymers thereof and blends thereof. The yarns may be based on a blend of thermoplastic polymers or of thermoplastic copolymers.

In the airbag field, the overall titer of the yarns forming the fabric or knit is usually between 100 and 950 decitex or dtex. Preferably, the overall titer of the yarns forming the fabric or knit is between 350 and 750 dtex. The basic fabric or knit of the invention advantageously has a weight, before coating, of between 150 and 250 g/m$^2$. Such polyamide fabrics of 470 dtex having these characteristics may thus be mentioned. It will be noted that use may also be made of textile substrates, in particular fabrics, formed from technical textile fibers, that is to say textile fibers having improved properties compared with standard fibers, for example increased fastness, to confer particular or reinforced properties as a function of the applications of the coated support or fabric.

The fabrics described above can be woven on air-jet, water-jet or rapier weaving looms. These fabrics are preferably obtained without a washing step after weaving, which simplifies the method for obtaining the fabrics, and decreases the cost thereof.

Furthermore, these fabrics can also be obtained without a heat-treatment step after weaving. Indeed, a heat-treatment step is generally carried out on the fabrics for the purpose of providing them with dimensional stability. This heat-treatment step can be carried out simultaneously with the step of drying the fabric, said drying step being necessary when a washing step has been carried out on the fabric. In the context of the present invention, when the washing step is eliminated, the drying step is no longer required.

According to one preferred embodiment, the process according to the invention is characterized in that the fibrous support has not undergone a washing step after weaving.

According to another embodiment, the process according to the invention is characterized in that the fibrous support has not undergone a heat-treatment step after weaving.

The invention also relates to a fibrous support coated with a silicone elastomer that can be obtained by means of the process according to the invention and as described above. It is a woven, knitted or nonwoven fibrous support, characterized in that it comprises at least one coating obtained according to the process according to the invention and as described above or obtained by crosslinking a silicone composition A according to the invention and as described above.

Finally, the invention relates to the airbags comprising a silicone elastomer according to the invention and as described above or a fibrous support according to the invention and as described above.

To finish, the invention also relates to the use of the crosslinkable silicone coating composition A according to the invention and as described above, for coating woven, knitted or nonwoven fibrous supports. Preferentially, these coated fibrous supports are intended to form airbags for the protection of vehicle occupants, but they can also be used for the manufacture of tent fabrics, parachute fabrics, and the like.

Thus, the invention also relates to the use of the silicone composition A according to the invention and as described above, for coating an airbag intended for the protection of a passenger in a vehicle.

The following examples of preparing compositions and of the application thereof as a fabric coating according to the process of the invention will make it possible to understand the invention more clearly.

EXAMPLES

1) Definition of the Constituents

Organopolysiloxane E1: polydimethylsiloxane oil blocked at each of the chain ends by a $(CH_3)_2ViSiO_{1/2}$ unit, having a viscosity of 60 000 mPa·s.
Resin F1: organopolysiloxane of formula $MM^{Vi}Q$ containing 1.1% by weight of vinyl groups.
Catalyst C1: platinum metal, introduced in the form of an organometallic complex containing 10% by weight of platinum metal, known as Karstedt catalyst.
Organohydropolysiloxane H1: poly(dimethyl)(hydromethyl)siloxane oil having a viscosity of 25 mPa·s and containing 0.7 mol of Si—H function per 100 g of oil.
Inhibitor I1: 1-ethynyl-1-cyclohexanol or ECH.
Filler J1: Non-treated precipitated calcium carbonate with a mean equivalent diameter of 2 µm.
Components tested as adhesion promotors:
glycidoxypropyltrimethoxysilane (GLYMO),
butyl titanate $Ti(OBu)_4$ (TBT)
Various additives K1 to K11, details provided hereinafter (see table 1)

2) Synthesis of the Additives K1 to K11

Various additives were synthesized, consisting of:
n $YCH_3SiO_{2/2}$ units
m $HCH_3SiO_{2/2}$ units
p $(CH_3)_2SiO_{2/2}$ units
2 $R^1(CH_3)_2Si_{1/2}$ units with $R^1$=$CH_3$ or H
wherein Y is the epoxy group of formula below

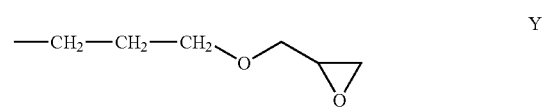

Additive K1:
181.0 g of toluene are introduced into a 1 l reactor under nitrogen. The medium is stirred and heated to 85° C. When the temperature is reached, 10.2 mg of a platinum-carbene complex, sold by Umicore under the trade name Umicore H5432®, are introduced. A mixture of allyl glycidyl ether (AGE) (236.8 g, 2.07 mol) and of a polymethylhydrosiloxane H2 with 9 $(CH_3)HSiO_{2/2}$ units and two $(CH_3)_3SiO_{1/2}$ end units (363.2 g, SiH=4.77 mol) is then added dropwise over the course of 4 hours. After returning to ambient temperature, the reaction medium is devolatilized at 25-30° C. under 0-3 mbar for 30 min, then at 85° C. (setpoint) under 1 mbar for 3 h, to give a functionalized silicone oil composed of n $YCH_3SiO_{2/2}$ units, m $HCH_3SiO_{2/2}$ units and two $(CH_3)_3Si_{1/2}$ units with the following characteristics: n+m=9; [SiH]=586 mmol/100 g; [Epoxy]=291 mmol/100 g; Viscosity=32 mPa·s.

Additive K2:
181.92 g of toluene are introduced into a 1 l reactor under nitrogen. The medium is stirred and heated to 85° C. When the temperature is reached, 10.3 mg of a platinum-carbene complex, sold by Umicore under the trade name Umicore HS432®, are introduced. A mixture of allyl glycidyl ether (AGE) (280.3 g, 2.46 mol) and of polymethylhydrosiloxane H2 (320.6 g, SiH=4.25 mol) is then added dropwise over the course of 7 hours. After returning to ambient temperature, the reaction medium is devolatilized at 25-30° C. under 0-3 mbar for 30 min, then at 85° C. (setpoint) under 1 mbar for 3 h, to give a functionalized silicone oil composed of n $YCH_3SiO_{2/2}$ units, m $HCH_3SiO_{2/2}$ units and two $(CH_3)_3Si_{1/2}$ units with the following characteristics: n+m=9; [SiH]=433 mmol/100 g; [Epoxy]=347 mmol/100 g; Viscosity=67 mPa·s.

Additive K3:
1733.9 g of toluene and 2.7 g of a platinum-carbene complex, sold by Umicore under the trade name Umicore HS432®, in solution in toluene, are introduced into a 10 l reactor under nitrogen. This mixture is stirred and heated to 77° C. A mixture of allyl glycidyl ether (AGE) (390.5 g, 3.42 mol) and of polymethylhydrosiloxane H3 comprising 20 $(CH_3)HSiO_{2/2}$ units and two $(CH_3)_3SiO_{1/2}$ end units (5599.5 g, SiH=82.23 mol) is added by means of a pump over the course of 54 min. When the addition has ended, the heating is maintained for 1 hour. The heating is then stopped and, after returning to ambient temperature, the reaction medium is devolatilized at 40° C. under 5 mbar for 1 hour and then the temperature is gradually increased up to 85° C. over the course of 4 h. The temperature is maintained at 85° C. for 1 hour, to give a functionalized silicone oil (7727.8 g) composed of n $YCH_3SiO_{2/2}$ units, m $HCH_3SiO_{2/2}$ units and two $(CH_3)_3Si_{1/2}$ units with the following characteristics: n+m=20; [SiH]=1.30 mol/100 g; [Epoxy]=37.7 mmol/100 g; Viscosity=12.3 mPa·s.

Additive K4:
142.0 g of toluene are introduced into a 1 l three-necked flask under nitrogen. The medium is magnetically stirred and heated to 85° C. When the temperature is reached, 1.1910 g of Pt/C are introduced. A mixture of allyl glycidyl ether (AGE) (180.6 g, 1.58 mol) and of polymethylhydrosiloxane H3 (420.0 g, SiH=6.27 mol) is then added dropwise over the course of 16 hours. After returning to ambient temperature, the reaction medium is filtered, treated and filtered, then devolatilized at 25-30° C. under 0-3 mbar for 30 min, then at 90° C. (setpoint) under 1 mbar for 3 h, to give a functionalized silicone oil composed of n $YCH_3SiO_{2/2}$ units, m $HCH_3SiO_{2/2}$ units and two $(CH_3)_3Si_{1/2}$ units with the following characteristics: n+m=20; [SiH]=892 mmol/100 g; [Epoxy]=198 mmol/100 g; Viscosity=103 mPa·s.

Additive K5:
100.1 g of toluene and 10 mg of a platinum-carbene complex, sold by Umicore under the trade name Umicore HS432®, are introduced into a 500 ml round-bottomed flask under nitrogen. This mixture is magnetically stirred and heated to 85° C. A mixture of allyl glycidyl ether (AGE) (150.2 g, 1.32 mol) and of polymethylhydrosiloxane H3 (349.0 g, SiH=5.21 mol) is added dropwise over the course of 3 hours. When the addition has ended, the dropping funnel is rinsed with 30 g of toluene and the heating is maintained for 2 hours. After returning to ambient temperature, the reaction medium is devolatilized at 92° C. under 1 mbar for 3 hours, to give a functionalized silicone oil (455.0 g) composed of n $YCH_3SiO_{2/2}$ units, m $HCH_3SiO_{2/2}$ units and two $(CH_3)_3Si_{1/2}$ units with the following characteristics: n+m=20; [SiH]=999 mmol/100 g; [Epoxy]=189.7 mmol/100 g; Viscosity=101 mPa·s.

Additive K6:
105.1 g of toluene and 11 mg of a platinum-carbene complex, sold by Umicore under the trade name Umicore HS432®, are introduced into a 500 ml round-bottomed flask under nitrogen. This mixture is magnetically stirred and heated to 85° C. A mixture of allyl glycidyl ether (AGE) (249.2 g, 2.18 mol) and of polymethylhydrosiloxane H3 (302.6 g SiH=4.52 mol) is added dropwise over the course of 3 hours. When the addition has ended, the dropping funnel is rinsed with 45.4 g of toluene and the heating is maintained for 2 hours. After returning to ambient temperature, the reaction medium is devolatilized at 92° C. under 1 mbar for 3 hours, to give a functionalized silicone oil (449.0 g) composed of n $YCH_3SiO_{2/2}$ units, m $HCH_3SiO_{2/2}$ units and two $(CH_3)_3Si_{1/2}$ units with the following characteristics: n+m=20; [SiH]=568 mmol/100 g; [Epoxy]=324.3 mmol/100 g; Viscosity=186 mPa·s.

Additive K7:
107.1 g of toluene and 13.3 mg of a platinum-carbene complex, sold by Umicore under the trade name Umicore HS432®, are introduced into a 500 ml round-bottomed flask under nitrogen. This mixture is magnetically stirred and heated to 85° C. A mixture of allyl glycidyl ether (AGE) (333.8 g, 2.92 mol) and of polymethylhydrosiloxane H3 (291.1 g SiH=4.35 mol) is added dropwise over the course of 3 hours. When the addition has ended, the dropping funnel is rinsed with 30 g of toluene and the heating is maintained for 2 hours. After returning to ambient temperature, the reaction medium is devolatilized at 92° C. (setpoint) under 1 mbar for 3 hours, to give a functionalized silicone oil (534.0 g) composed of n $YCH_3SiO_{2/2}$ units, m $HCH_3SiO_{2/2}$ units and two $(CH_3)_3Si_{1/2}$ units with the following characteristics: n+m=20; [SiH]=376.7 mmol/100 g; [Epoxy]=380.7 mmol/100 g; Viscosity=610 mPa·s.

Additive K8:
469.7 g of allyl glycidyl ether (AGE) (4.11 mol) and 14.3 mg of a platinum-carbene complex, sold by Umicore under the trade name Umicore HS432®, are introduced into a 500 ml round-bottomed flask under nitrogen. This mixture is magnetically stirred and heated to 85° C. The polymethylhydrosiloxane H3 (205.4 g, SiH=3.01 mol) is added dropwise over the course of 5 hours. An exotherm of 90° C. is observed. When the addition has ended, the heating is maintained for 3 hours. After returning to ambient temperature, the reaction medium is devolatilized at 90° C. under 1 mbar for 3 hours, to give a functionalized silicone oil composed of 20 $YCH_3SiO_{2/2}$ units and two $(CH_3)_3Si_{1/2}$ units with the following characteristics: [SiH]=0 mmol/100 g; [Epoxy]=537 mmol/100 g; Viscosity=929 mPa·s.

Additive K9:
178.2 g of toluene are introduced into a 1 l three-necked flask under nitrogen. The medium is magnetically stirred and heated to 85° C. When the temperature is reached, 0.6280 g of Pt/C is introduced. A mixture of allyl glycidyl ether (AGE) (77.6 g, 0.68 mol) and of polymethylhydrosiloxane H4 comprising 16 $(CH_3)HSiO_{2/2}$ units, 18 $(CH_3)_2SiO_{2/2}$ units and two $(CH_3)_2HSiO_{1/2}$ end units (522.9 g, SiH=6.80 mol) is then added dropwise over the course of 8 hours. After returning to ambient temperature, the reaction medium is filtered, treated and filtered, then devolatilized at 25-30° C. under 0-3 mbar for 30 min, then at 90° C. under 1 mbar for 2 h, to give a functionalized silicone oil composed of 18 $(CH_3)_2SiO_{2/2}$ units, n $YCH_3SiO_{2/2}$ units, m $HCH_3SiO_{2/2}$ units and two $H(CH_3)_2Si_{1/2}$ units with the following characteristics: n+m=16; [SiH]=519 mmol/100 g; [Epoxy]=102 mmol/100 g; Viscosity=64 mPa·s.

Additive K10:

188.9 g of toluene are introduced into a 1 l three-necked flask under nitrogen. The medium is magnetically stirred and heated to 85° C. When the temperature is reached, 0.6504 g of Pt/C is introduced. A mixture of allyl glycidyl ether (AGE) (136.3 g, 1.19 mol) and of polymethylhydrosiloxane H4 (465.7 g, SiH=2.77 mol) is then added dropwise over the course of 8 hours. After returning to ambient temperature, the reaction medium is filtered, treated and filtered, then devolatilized at 25-30° C. under 0-3 mbar for 30 min, then at 90° C. (setpoint) under 1 mbar for 2 h, to give a functionalized silicone oil composed of 18 $(CH_3)_2SiO_{2/2}$ units, n $YCH_3SiO_{2/2}$ units, m $HCH_3SiO_{2/2}$ units and two $H(CH_3)_2Si_{1/2}$ units with the following characteristics: n+m=16; [SiH]=347 mmol/100 g; [Epoxy]=171.2 mmol/100 g; Viscosity=90.4 mPa·s.

Additive K11:

104.0 g of toluene are introduced into a 1 l three-necked flask under nitrogen. The medium is magnetically stirred and heated to 80° C. When the temperature is reached, 887 mg of Pt/C are introduced. A mixture of allyl glycidyl ether (AGE) (171.5 g, 1.50 mol) and of polymethylhydrosiloxane H5 comprising 27 $(CH_3)HSiO_{2/2}$ units, 7 $(CH_3)_2SiO_{2/2}$ units and two $(CH_3)_2HSiO_{1/2}$ end units (250.0 g, SiH=3.16 mol) is then added dropwise over the course of 6 hours. After returning to ambient temperature, the reaction medium is filtered, then devolatilized at 25-30° C. under 0-3 mbar for 30 min, then at 90° C. (setpoint) under 1 mbar for 1 h, to give a functionalized silicone oil composed of 7 $(CH_3)_2SiO_{2/2}$ units, n $YCH_3SiO_{2/2}$ units, m $HCH_3SiO_{2/2}$ units and two $H(CH_3)_2Si_{1/2}$ units with the following characteristics: n+m=27; [SiH]=517 mmol/100 g; [Epoxy]=293 mmol/100 g; Viscosity=140 mPa·s.

Table 1 below gives details of the various synthesized linear organopolysiloxanes K1 to K11.

3) Preparation of the Coated Fibrous Supports a) Preparation of a Composition from a Two-Component Precursor:

The compositions are obtained by mixing, at ambient temperature, 100 parts by weight of a part A and 10 parts by weight of a part B of a two-component system (see compositions in table 2), b) the mixture is coated, with a deposited weight of approximately 30 to 36 g/m² of fibrous support, so as to form a layer, by means of scrapers or rolls, onto the chosen fabric, and c) the resulting layer is crosslinked for 60 seconds at 190° C. in a Mathis oven so as to obtain an elastomer.

4) Tests Carried Out on the Coated Fabrics

The various coated fabrics are subjected to the "scrub" test described in detail below, in order to measure the adhesion performances of the silicone elastomer on the various fabrics.

The crease and abrasion resistance test, called "scrub" test, characterizes the good adhesion of the silicone elastomer on the fibrous support. It is carried out according to the standard EN ISO 5981-Method A. This test consists in subjecting a test specimen of coated textile support with dimensions of 50 mm×100 mm, on the one hand, to a shear movement by means of two jaws clamping the opposite two edges of the test specimen and performing an alternating movement with respect to one another, and, on the other hand, to an abrasion by contact with a mobile support or skate which applies a 5 N force on the test specimen. This test is carried out either 24 hours after the coating or after accelerated aging for 7 days at 80° C. and 95% relative humidity. After 500 creasing operations, the coated fabric is verified. If the coating has not been delaminated, the abrasion resistance is satisfactory and a further 500 creasing operations are carried out before verifying the condition of the fabric. The test is finalized when the condition of the coated fabric is not satisfactory.

The silicone compositions described in detail in table 2 below were evaluated as compositions for coating airbag fabrics.

TABLE 1

Synthesized linear organopolysiloxanes K1 to K11

| | Additive | | | | | | | | | | |
|---|---|---|---|---|---|---|---|---|---|---|---|
| | K1 | K2 | K3 | K4 | K5 | K6 | K7 | K8 | K9 | K10 | K11 |
| Total number of siloxyl units | 11 | 11 | 22 | 22 | 22 | 22 | 22 | 22 | 36 | 36 | 36 |
| Number of $(CH_3)_2SiO_{2/2}$ units | 0 | 0 | 0 | 0 | 0 | 0 | 0 | 0 | 18 | 18 | 7 |
| [epoxy] mmol/100 g | 291 | 347 | 38 | 198 | 190 | 324 | 381 | 537 | 102 | 171 | 293 |
| [SiH] mmol/100 g | 586 | 433 | 1300 | 892 | 999 | 568 | 377 | 0 | 519 | 347 | 517 |
| [SiH]/[epoxy] | 2.2 | 1.2 | 34.2 | 4.5 | 5.3 | 1.8 | 1 | 0 | 5.1 | 2 | 1.8 |

TABLE 2

Search for an improved adhesion promoter system

| | Composition | | | | | |
|---|---|---|---|---|---|---|
| | C1 Patent EP0681014 | C2 Comparative example | I1 Invention | I2 Invention | C3 Comparative example | C4 Comparative example |
| Part A (parts by weight) | | | | | | |
| Vinylated oil E1 | 52.7 | 52.7 | 52.7 | 50.7 | 49.7 | 48.0 |
| Organohydropolysiloxane H1 | 5.8 | 0.0 | 0.0 | 0.0 | 5.8 | 5.8 |
| Resin F1 | 20.0 | 21.1 | 21.1 | 21.1 | 20.0 | 20.0 |
| ECH | 0.025 | 0.025 | 0.025 | 0.025 | 0.025 | 0.025 |
| Calcium carbonate J1 | 18.5 | 18.5 | 18.5 | 18.5 | 18.5 | 18.5 |
| Adhesion promoters | | | 0.0 | | | |
| VTMO | 1.0 | | | | | |
| GLYMO | 2.0 | | | 2.0 | 6.0 | 7.7 |
| Additive K1 | | 7.7 | 7.7 | 7.7 | 0.0 | 0.0 |
| TOTAL | 100 | 100 | 100 | 100 | 100 | 100 |
| Part B (parts by weight) | | | | | | |
| Vinylated oil E1 | 8.28 | 9.48 | 8.68 | 8.68 | 8.68 | 8.68 |
| Coloring base | 0.9 | 0.5 | 0.5 | 0.5 | 0.5 | 0.5 |
| TBOT | 0.8 | 0 | 0.8 | 0.8 | 0.8 | 0.8 |
| Catalyst C | 0.02 | 0.02 | 0.02 | 0.02 | 0.02 | 0.02 |
| TOTAL | 10 | 10 | 10 | 10 | 10 | 10 |
| H/Vi composition | 2.4 | 4 | 4 | 4.3 | 4 | 4 |
| [epoxy] composition in mmol/100 g | 7.13 | 22.2 | 20.9 | 27.5 | 21.4 | 27.5 |
| [SiH] composition in mmol/100 g | 36.4 | 39.3 | 39.3 | 41 | 36.4 | 36.4 |

100 parts by weight of part A and 10 parts by weight of part B are mixed so as to obtain the coating compositions. These compositions were coated onto and then crosslinked on two types of polyester fabric: a washed and heat-set polyester fabric and a non-heat-set loomstate polyester fabric. The scrub test results for evaluating the adhesion and the abrasion resistance of the silicone coating are presented in table 3 below.

TABLE 3 abrasion resistance tests on polyester fabrics after coating and crosslinking

| | Compositions | | | | | |
|---|---|---|---|---|---|---|
| | C1 | C2 | I1 | I2 | C3 | C4 |
| Scrub test results- washed and heat-set Polyester Fabric | | | | | | |
| After 24 h | 500 | 1500 | 1000 | 1500 | 500 | 500 |
| After 7 d/80° C., 95% RH | 1000 | 1000 | 1000 | 1000 | 0 | 500 |
| Scrub test results- Loomstate Polyester Fabric | | | | | | |
| After 24 h | 500 | 0 | 500 | 500 | 0 | 0 |
| After 7 d/80° C., 95% RH | 0 | 500 | 1000 | 1000 | 0 | 0 |

The PET fabric coated with a composition I1 according to the invention comprising as adhesion promoter the SiH-functionalized and Si-epoxy-functionalized organopolysiloxane K1 and butyl titanate exhibits very good abrasion resistance after 24 h and after aging at 80° C. at 95% relative humidity for 7 days. This is verified on a PET fabric that has been washed and heat-set and also on a loomstate PET fabric that has been neither washed nor heat-set. In the absence of butyl titanate (composition C2), the adhesion obtained after 24 h on loomstate PET is not satisfactory.

The comparative examples C3 and C4 show that, when the same concentration of epoxy and SiH units in the silicone composition is obtained by using as adhesion promoter glycidoxypropyltrimethoxysilane (GLYMO) and TBOT and a crosslinking SiH oil without epoxy units, the abrasion resistance of the heat-set or loomstate coated PET fabric is not satisfactory.

By way of comparison, the composition C1 according to the prior art EP0681014, comprising GLYMO, VTMO and TBOT as adhesion promoters, does not make it possible to obtain good abrasion resistance after humid aging when the coated fabric is loomstate PET.

The additive K1 comprising SiH and Si-epoxy units and acting as adhesion promoter and crosslinking agent makes it possible to obtain better adhesion of the silicone coating on PET.

The organopolysiloxanes K2 to K11 were tested as adhesion promoters as a replacement for K1 in a silicone composition such as that of I1 described in detail in table 2. The amount of adhesion promoter K2 to K11 is adjusted so as to have a concentration of epoxy functions in the silicone composition of between 20 and 22 mmol/100 g and to maintain the molar ratio of Si—H units to SiVi units of the composition (H/Vi ratio) between 2 and 5, which is optimal for this application. Consequently, when the adhesion promoter has few SiH units and many epoxy units, crosslinking organohydropolysiloxane H1 is added so as to keep the SiH concentration in the network constant. This is the case with the compositions C1, C8 and 15. On the other hand, when the adhesion promoter tested has many SiH units, in order to maintain the H/Vi ratio below 5, the epoxy concentration in the silicone composition is less than 20 mmol/100 g of silicone composition. The concentrations of SiH units and of epoxy units and the H/Vi ratio of the silicone coating compositions are described in detail in table 4 below.

TABLE 4

Silicone coating compositions

| | Test | | | | | | | | | | | |
|---|---|---|---|---|---|---|---|---|---|---|---|---|
| | C2 | I1 | I3 | C5 | C6 | C7 | I4 | I5 | C8 | C9 | C10 | C11 |
| | | | | | | Additive | | | | | | |
| | Glymo | K1 | K2 | K3 | K4 | K5 | K6 | K7 | K8 | K9 | K10 | K11 |
| [epoxy] composition in mmol/100 g | 21.4 | 20.9 | 24.3 | 1.5 | 9 | 7.1 | 22.2 | 22.2 | 22 | 7.7 | 18.8 | 22 |
| [SiH] composition in mmol/100 g | 36.4 | 39.3 | 30.3 | 59.8 | 38.9 | 37.6 | 38.9 | 38 | 36.4 | 38.9 | 38.2 | 39 |
| Addition organohydropoly siloxane H1 | yes | | | | | | | yes | yes | | | |
| H/Vi | | 4.3 | 4.4 | 3.5 | 4.2 | 4.1 | 4.3 | 4.2 | 4.0 | 4.3 | 4.2 | 4.3 |

These compositions were coated onto and then crosslinked on fabrics made of polyester or polyamide or on(to) both. The results are presented in tables 5 and 6 below.

Table 5 presents the scrub test results for evaluating the adhesion and the abrasion resistance of the silicone coating on two types of polyester fabric: a polyester fabric that has been washed and heat-set and a loomstate polyester fabric that has not been heat-set.

TABLE 5

Abrasion resistance tests on polyester fabrics after coating and crosslinking

| | Test | | | | | | | | | | |
|---|---|---|---|---|---|---|---|---|---|---|---|
| | C2 | I1 | I3 | C5 | C6 | C7 | I4 | C8 | C9 | C10 | C11 |
| | | | | | | Additives | | | | | |
| | | K1 | K2 | K3 | K4 | K5 | K6 | K8 | K9 | K10 | K11 |
| Scrub test results- washed and heat-set Polyester Fabric | | | | | | | | | | | |
| After 24 h | 500 | 500 | 500 | 0 | 1000 | 500 | 1500 | 500 | 0 | 500 | 500 |
| After 7 d/80° C., 95% RH | 0 | 1500 | 1000 | 0 | 0 | 0 | 1500 | 500 | 0 | 0 | 1000 |
| Scrub test results- Loomstate Polyester Fabric | | | | | | | | | | | |
| After 24 h | 0 | 500 | 500 | 0 | 0 | 0 | 500 | 0 | 0 | 0 | 0 |
| After 7 d/80° C., 95% RH | 0 | 1000 | 1000 | 0 | 0 | 0 | 1000 | 0 | 0 | 0 | 0 |

The silicone compositions C5, C6, C7 and C9 comprising adhesion promoters with a ratio of SiH/epoxy units 4 which result in a silicone composition with less than 10 mmol of epoxy units per 100 g of composition do not have sufficient abrasion resistance.

The silicone compositions C10 and C11 comprising adhesion promoters comprising units D not functionalized with $Si(CH_3)_2O_{2/2}$ despite a ratio of SiH/epoxy units <4, and a concentration of SiH and epoxy units in the composition that are comparable to those of I1, have poor abrasion resistance on loomstate polyester fabric.

The composition C8 comprising an adhesion promoter K8 comprising only epoxy units and a concentration of SiH and epoxy units in the composition that are comparable to those of I1 by the addition of crosslinking organohydropolysiloxane H1 also does not give good abrasion resistance. The additive X comprising SiH and Si-epoxy units and acting as adhesion promoter and crosslinking agent is consequently essential for improving the adhesion.

Table 6 presents the scrub test results for evaluating the adhesion and the abrasion resistance of the silicone coating on two types of polyamide fabric: a polyamide fabric that has been washed and heat-set and a loomstate polyamide fabric that has not been heat-set.

TABLE 6

Abrasion resistance tests on polyamide fabrics after coating and crosslinking

| | Test | | | | | | | |
|---|---|---|---|---|---|---|---|---|
| | I1 | C6 | C7 | I5 | C6 | C7 | C8 | C9 |
| | | | | | Additives | | | |
| | K1 | K4 | K5 | K7 | K8 | K9 | K10 | K11 |
| Scrub test results- washed and heat-set Polyamide Fabric | | | | | | | | |
| After 24 h | 1000 | 0 | 1000 | 1500 | 0 | 0 | 0 | 500 |
| After 7 d/80° C., 95% RH | 2500 | 0 | 2500 | 4000 | 1500 | 0 | 500 | 500 |
| Scrub test results- Loomstate Polyamide Fabric | | | | | | | | |
| After 24 h | 1000 | 0 | 0 | 500 | 0 | 0 | 0 | 0 |
| After 7 d/80° C., 95% RH | 1000 | 0 | 0 | 5500 | 0 | 0 | 0 | 0 |

It was verified that, after coating and crosslinking of the compositions according to the invention, the coated fabrics attain the combing-resistance and tear-resistance values in accordance with what is required for the airbag application.

The invention claimed is:

1. A silicone composition A comprising a silicone base B capable of crosslinking or curing by polyaddition and comprising an adhesion promoter system D comprising at least one organic titanium compound M and at least one additive X which is a linear organopolysiloxane comprising siloxyl units (I.1) to (I.3) having the formulae below:

$$Y_a Z^1_b SiO_{\frac{4-(a+b)}{2}} \quad (I.1)$$

$$Z^2_3 SiO_{\frac{1}{2}} \quad (I.2)$$

$$H_d Z^3_e SiO_{\frac{4-(d+e)}{2}} \quad (I.3)$$

and not comprising units of formula (I.4):

$$Z^2_2 SiO_{\frac{2}{2}} \quad (I.4)$$

wherein
- a=1 and b=1 or 2
- d=1 and e=1 or 2
- Y represents a radical comprising a hydrocarbon-based group having from 2 to 20 carbon atoms and an epoxy function, with optionally one or more heteroatoms,
- $Z^1$, $Z^2$ and $Z^3$, which may be identical or different, represent a monovalent hydrocarbon-based group having from 1 to 30 carbon atoms,
- with the condition according to which the additive X comprises, per molecule, at least two siloxyl units (I.1) bearing epoxyfunctional hydrocarbon-based groups and at least three siloxyl units (I.3) bearing hydrosiloxyl groups.

2. The silicone composition A as claimed in claim 1, wherein the additive X has a total number of siloxyl units of between 7 and 30.

3. The silicone composition A as claimed in claim 1, wherein the additive X does not contain alkoxy, vinyl, hydroxyl or methacryloxy functional groups.

4. The silicone composition A as claimed in claim 1, wherein the additive X has a molar ratio between the siloxyl units (I.1) and the siloxyl units (I.3) of between 0.5 and 4.

5. The silicone composition A as claimed in claim 1, wherein the adhesion promoter system D also comprises an organosilane G comprising at least one epoxy radical.

6. The silicone composition A as claimed in claim 1, wherein the concentration of epoxy units is between 10 and 60 mmol per 100 g of composition A.

7. The silicone composition A as claimed in claim 1, wherein the silicone base B comprises
- at least one organopolysiloxane E having, per molecule, at least two $C_2$-$C_{12}$ alkenyl groups each bonded to a different silicon atom,
- at least one organopolysiloxane resin F comprising from 0.1% to 20% by weight of C2-C6 alkenyl groups each bonded to a different silicon atom,
- optionally at least one organohydropolysiloxane H having, per molecule, at least two hydrogen atoms each bonded to a different silicon atom,
- an effective amount of a polyaddition catalyst C which is a metal or metal compound of the platinum group,
- at least one inhibitor I, and
- optionally at least one filler J.

8. A two-component precursor system for the composition A as claimed in claim 7 which is in two distinct parts A1 and A2 intended to be mixed so as to form the composition A, wherein one of said parts contains the catalyst C while the other part contains the additive X and the organohydropolysiloxane H.

9. A silicone elastomer that can be obtained by crosslinking and/or curing the silicone composition A as defined in claim 1.

10. A process for preparing a fibrous support coated with a silicone elastomer, comprising:
  a) preparing the silicone composition A as claimed in claim 1,
  b) applying onto one or two faces of a fibrous support at least 10 g/m² of the silicone composition A prepared in a), and
  c) crosslinking the deposit formed in b) so as to form an elastomer by heating at a temperature that can reach 210° C., optionally through action of electromagnetic radiation or hot air.

11. The process as claimed in claim 10, wherein the fibrous support is made of polyamide or of polyester.

12. The process as claimed in claim 10, wherein the fibrous support has not undergone washing after weaving.

13. The process as claimed in claim 10, wherein the fibrous support has not undergone heat-treatment after weaving.

14. A fibrous support coated with a silicone elastomer that can be obtained by means of the process as defined in claim 10.

15. An airbag comprising the silicone elastomer as claimed in claim 9 or a fibrous support coated with said silicone elastomer.

16. The silicone composition A according to claim 1, wherein
- Y is a radical selected from the group consisting of alkyl glycidyl ether, linear epoxyalkyl, branched epoxyalkyl, cyclic epoxyalkyl, linear epoxyalkenyl, branched epoxyalkenyl, cyclic epoxyalkenyl, and carboxylic acid glycidyl ester,
- $Z^1$, $Z^2$ and $Z^3$, which may be identical or different, are selected from the group consisting of C1-C8-alkyl and C6-C12-aryl.

17. The silicone composition A according to claim 1, wherein
- $Z^1$, $Z^2$ and $Z^3$, which may be identical or different, are selected from the group consisting of methyl, ethyl, propyl, 3,3,3-trifluoropropyl, xylyl, tolyl, and phenyl.

18. The silicone composition A as claimed in claim 1, wherein the additive X has a molar ratio between the siloxyl units (I.1) and the siloxyl units (I.3) of between 0.8 and 3.

19. The silicone composition A as claimed in claim 7, wherein at least one organohydropolysiloxane H is present and has at least three hydrogen atoms each bonded to a different silicon atom.

20. The silicone composition A as claimed in claim 1, wherein a concentration of epoxy units is between 15 and 40 mmol per 100 g of composition A.

* * * * *